United States Patent [19]
Ecoffey et al.

[11] Patent Number: 4,876,883
[45] Date of Patent: Oct. 31, 1989

[54] PNEUMATIC RING GAUGE

[75] Inventors: Olivier Ecoffey, Colombier; Théodore Mueller, Lamboing; Hans Sigg, Neuchatel, all of Switzerland

[73] Assignee: Meseltron S.A., Corcelles, Switzerland

[21] Appl. No.: 168,075

[22] Filed: Mar. 14, 1988

[30] Foreign Application Priority Data

Mar. 16, 1987 [CH] Switzerland .................. 967/87

[51] Int. Cl.$^4$ ............................................. G01B 13/08
[52] U.S. Cl. .................................................. 73/37.5
[58] Field of Search .................. 384/49; 73/37.5, 37.6, 73/37.8

[56] References Cited

U.S. PATENT DOCUMENTS

| 1,856,359 | 5/1932 | Stanton | 384/49 |
| 4,543,816 | 10/1985 | Brand et al. | 73/37.8 |

FOREIGN PATENT DOCUMENTS

| 214797 | 11/1956 | Australia | 384/49 |
| 2001072 | 9/1969 | France | |

Primary Examiner—Hezron E. Williams
Attorney, Agent, or Firm—Griffin, Branigan, & Butler

[57] ABSTRACT

A ring gauge includes an entry zone followed by a measuring zone defined by a guide cylinder in which is installed an air jet measuring system. The entry zone includes a first region exhibiting an opening substantially larger than the opening of the guide cylinder then a second region including a spring support guide structure which defines a circle the diameter of which is equal to the diameter of the guide cylinder opening, and finally a third tapered region having an entry diameter substantially greater than that of the guide cylinder opening and an exit diameter equal to that of the guide cylinder opening. The gauge is employed for checking the outer diameter of cylindrical parts which may penetrate therein without jamming.

2 Claims, 1 Drawing Sheet

PNEUMATIC RING GAUGE

BACKGROUND OF THE INVENTION

This invention concerns a ring gauge for a pneumatic apparatus for measuring the outer diameter of a part, such ring gauge including an entry zone followed by a measuring zone defined by a guide cylinder in which an air jet measuring system is installed.

FIG. 1 shows very schematically in lengthwise cross-section an example of a measuring head 1 which is currently employed in this type of apparatus when it is simply a matter of measuring the diameter of a cylindrical bore of a part P.

The measuring head 1 includes an entry zone formed by a spherical portion 3 followed by a tapered part 4 and a measuring zone defined by a guide cylinder 5 in which there is installed an air jet measuring system which here includes jet nozzles 6 coupled to a source of compressed air not shown. Such measuring principle is known and has been described for instance in U.S. Pat. 4,538,449. It will be simply recalled here that it is sufficient to measure the air discharge coming out of the nozzles or the pressure of such air or indeed its flow rate in order to determine the value of the bore diameter. Naturally, for this it will also be necessary that the measuring apparatus be calibrated.

The measuring head thus briefly described is always chosen as a function of the bore of the part P to be measured in a manner such that the distance between portion 5 of such head and the internal surface of the part P does not exceed some tens of microns. The principal reason for operating thus is connected to the physical principle employed. Another reason is that very often the portion 5 is the sole guide means which one has available for the displacement and correct positioning of the head at the interior of the bore and to assure that the measures effected are correct.

It has just been mentioned that a very small play exists between the part to be measured P and the measuring head 1 which must be introduced therein, this necessitating that the head be introduced coaxially into the part if one wishes to avoid jamming. If such measurement is performed by hand on a large number of parts, the alignment which must be obtained between the head and the parts will slow down the measuring rate and thus the number of pieces which one will be able to measure per unit of time.

To overcome this difficulty the measuring head shown on FIG. 1 exhibits a special entry zone obtained by equipping the head with a spherical portion 3 followed by a tapered portion 4. The radius of sphere 3 is chosen to be equal to the radius of the cylinder 5. Thus head 1 may contact the part P at an angle of substantial misalignment, for instance 15° as is shown on FIG. 1. The head 1 may be introduced into part P until the edge 7 of bore 8 comes into contact with cone 4. In continuing the advancing movement head 7 will slide along the cone 4 until the cylindrical portion 5 of the head in turn penetrates into the bore. At this moment axis 9 of the measuring head will be coaxial with axis 10 of the part P and the head may be entirely introduced into the interior of the bore.

This manner of forming the measuring head is known and is applied for measuring the interior diameter of parts. We will now examine the opposite of this arrangement which consists of measuring by the same method the outer diameter of a cylindrical part. For this reference will be made to FIG. 2.

The measuring head 20 then becomes a ring which includes a tubular portion 21. The measuring zone is here constituted by a guide cylinder 22 in which are installed the jet nozzles 23 for compressed air. As in the preceding case, the diameter of the guide cylinder is arranged to be slightly greater than the diameter of the part to the measured P' (some tens of microns).

At an intermediate stage in the development of the present invention I invisioned a modification of the gauge of FIG. 1 to permit the measurement of the external diameter of a cylindrical body. This modification is illustrated in FIG. 2. To avoid jamming the part to be measured, ed to apply to the ring gauge the same entry arrangement as that which has been described for the sleeve of FIG. 1. There is found at the entry to the ring a toroidal region 24 followed by a conical region 25. The most constricted internal diameter of the torus is made equal to the diameter of the guide cylinder 22. It will however immediately be noted that a part to be measured P' introduced at a certain angle into the ring (here some 15°) will butt against the toroidal portion 24 by its edge 28 and it will be necessary to align the part P' in order that penetration may take place.

It will be observed that such jamming will also be produced for less unfavourable cases than that which has been shown on FIG. 2. Since the most constricted diameter of the torus is slightly greater than the diameter of the part to be measured P', this part may pass the constricted diameter if the angle of incidence formed by axis 26 of the ring and the axis 27 of the part P' is small. After this however, jamming may arise analogous to that which is known from a conical shank of the morse taper. In conclusion, the entry system proposed for a plug penetrating a bore is not suitable for a ring into which must be introduced a cylinder.

SUMMARY OF THE INVENTION

A solution to the problem as set forth in respect of a ring gauge is characterized by the entry zone including, successively in the sense of penetration of the part, a first region exhibiting an opening substantially larger than the opening exhibited by the guide cylinder, a second region including at least three guide means which define a circle the diameter of which is equal to the diameter of the guide cylinder opening, said means being adapted to be spread apart against the return force of a spring by the part being measured and a third tapered region having an entry diameter substantially greater than that of the guide cylinder opening and an exit diameter equal to that of the guide cylinder opening.

DESCRIPTION OF THE PREFERRED EMBODIMENT

Figure 1:
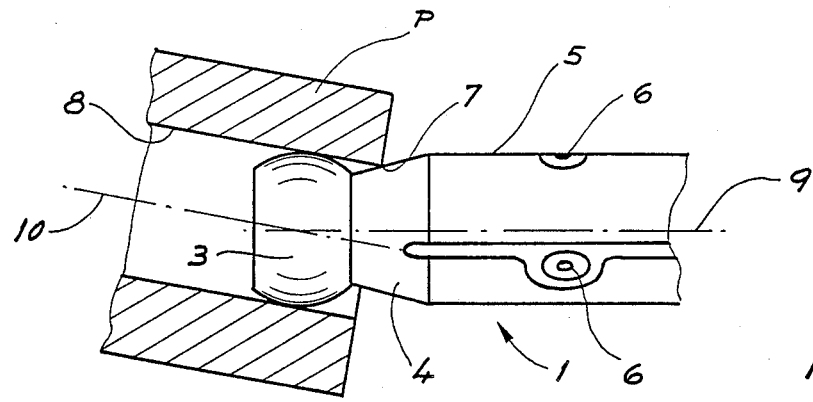
FIG. 1 shows a prior art pneumatic measuring head for measuring the internal diameter of a cylindrical bore.
Figure 2:
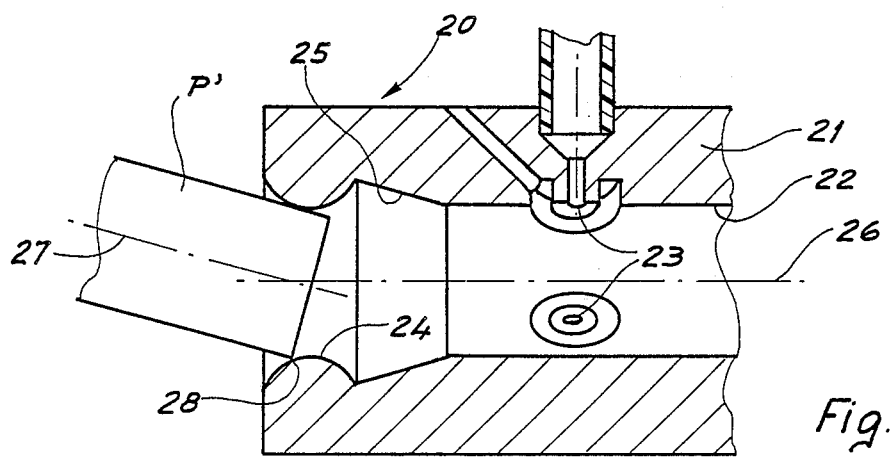
FIG. 2 illustrates a ring pressure gauge for measuring the external diameter of a cylindrical part; and, FIG. 3 illustrates a preferred embodiment of a ring gauge according to the present invention for measuring the external diameter of a cylindrical part.
Figure 3:
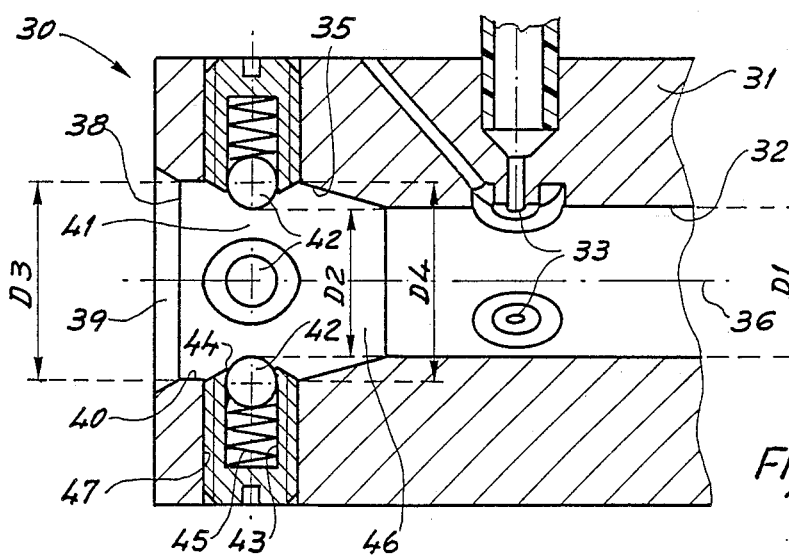

FIG. 3 is an embodiment of the ring gauge generally referenced by 30. This ring gauge includes a tubular body 31. As in the case of the ring gauge described with reference to FIG. 2, the measuring zone is constituted by a guide cylinder 32 of diameter D1 in which is installed an air jet measuring system here represented by two jet nozzles 33. As previously, it is arranged so that the diameter D1 is slightly greater than the diameter of the part to be measured (not shown here). The measuring zone is preceded by an entry zone which is about to be described in detail and which forms the essential characteristic of the invention.

The entry zone for the part to be measured includes, successively in the sense of penetration of the part, initially a first region 38 exhibiting an opening D3 substantially greater than the opening D1 exhibited by the guide cylinder 32. This region 38 here initially shows an entry cone 39 followed by a cylinder 40 the diameter of which is D3. One could imagine other embodiments, for instance a continuous taper, the small base of such truncated cone being subtended by diameter D3.

The entry zone next includes a second region 41 comprising at least three guide means 42 (four on FIG. 3) which define a circle, the diameter D2 of which is equal to the diameter D1 of the opening of the guide cylinder 32. In a completely general manner, these guide means are adapted to be spread apart by the part to be measured against the return force of a spring. In the special case of FIG. 3, the guide means 42 comprise balls each retained in a tube provided with a restriction 44, the balls being supported against the restriction by the return force of springs 45. FIG. 3 also shows that the penetration of the balls into the region 41 may be regulated by screwing or unscrewing tubes 43 which are provided with screw threads. In view of this adjustment, it is understood that the tops of the four balls 42 may be brought onto a circle of diameter D2 equal to diameter D1.

The entry zone finally comprises a third region 46 which is shown in the form of a truncated cone 35, the entry diameter D4 being substantially greater than the diameter D1 of the opening of the guide cylinder 32 and the exit diameter of which is equal to the diameter D1 of the opening of said guide cylinder. It is noted that this third region is similar to that already described in respect of FIG. 2.

There will now be explained the behaviour of a part if it penetrates into a corner of the ring gauge. In supposing that it is introduced in the same manner as part P' of FIG. 2, edge 28 will come to butt against the lower ball 42 and will cause this to be partially forced back into tube 43. Hence the part to be measured may continue its course until its same edge 28 comes into contact with the inclined plane of cone 35. Continuing its course, the part P' will be aligned when its end is introduced to the entry of the guide cylinder 32, its axis 27 will then be coaxial with the axis 36 of the guide cylinder and the part will penetrate without striking the cylinder upto the point provided for the measurement.

The invention which has just been described enables a high rate of measure, thus an excellent yield in production and checking of parts. This will be more particularly appreciated when the parts are automatically produced, for instance on centerless machines where the rate of measurement must not hold up the rate of production.

It will be noted that the guide means chosen for FIG. 3 comprise spring loaded pushpins which may be purchased in regular commerce. Such pushpins are provided with a thread 47 by virtue of which they may be screwed into a threading provided in the ring gauge.

What we claim is:

1. A ring gauge (30) for a pneumatic apparatus for measuring an outer diameter of a part (P1), such ring gauge including an entry zone followed by a measuring zone defined by a guide cylinder (32) in which an air jet measuring system (33) is installed, the guide cylinder exhibiting a diameter only slightly greater than the diameter of the part to be measured, the entry zone including, successively in the sense of penetration of the part, a first region (38) exhibiting an opening (D3) substantially larger than the opening (D1) exhibited by the guide cylinder, a second region (41) including at least three guide means (42) which define a circle the diameter (D2) of which is equal to the diameter (D1) of the guide cylinder opening, said guide means being adapted to be spread apart against the return force of a spring (45) by the part being measured and a third tapered region (46) having an entry diameter (D4) substantially greater than that of the guide cylinder opening and an exit diameter (D1) equal to that of the guide cylinder opening.

2. A ring gauge as set forth in claim 1 wherein said guide means comprise spring loaded pushpins screwed into the second region of the ring gauge entry zone.

* * * * *